(12) United States Patent
Lee

(10) Patent No.: US 8,892,027 B2
(45) Date of Patent: *Nov. 18, 2014

(54) METHOD AND APPARATUS FOR PROVIDING PREAUTHORIZATION FOR A MOBILE RECEIVING DEVICE TO ACCESS WIRELESS NETWORKS

(75) Inventor: Sean S. Lee, Potomac, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/439,450

(22) Filed: Apr. 4, 2012

(65) Prior Publication Data

US 2012/0192237 A1 Jul. 26, 2012

Related U.S. Application Data

(63) Continuation of application No. 11/656,758, filed on Jan. 22, 2007, now Pat. No. 8,175,514.

(51) Int. Cl.
*H04H 20/74* (2008.01)
*H04W 48/16* (2009.01)

(52) U.S. Cl.
CPC ................................. *H04W 48/16* (2013.01)

USPC ... 455/3.02; 455/3.05; 455/414.1; 455/422.1; 455/456.1

(58) Field of Classification Search
USPC .................. 455/3.02, 3.03, 3.05, 414.1, 12.1, 455/456.1, 422.1
See application file for complete search history.

(56) References Cited

U.S. PATENT DOCUMENTS

| | | |
|---|---|---|
| 2003/0096574 A1 | 5/2003 | Anderson et al. |
| 2006/0209743 A1 | 9/2006 | Matero et al. |
| 2006/0276150 A1 | 12/2006 | Ogasawara |
| 2008/0268830 A1 | 10/2008 | Sharma et al. |

*Primary Examiner* — Temica M Beamer

(57) ABSTRACT

A mobile wireless system includes a transmitter such as a satellite that broadcasts wireless signals such as boundaries for wireless networks to a mobile receiving device. Mobile receiving device may include an antenna. A locating receiver is used to generate locating signals so that a determination may be made to the location of the mobile receiving device. Preauthorizations may be obtained to allow the mobile receiving device to communicate back to business controller to enable functions such as pay-per-view or on-demand, interactive television, gaming, and the like. The preauthorizations enable access to various wireless networks as the mobile receiving device moves.

24 Claims, 6 Drawing Sheets

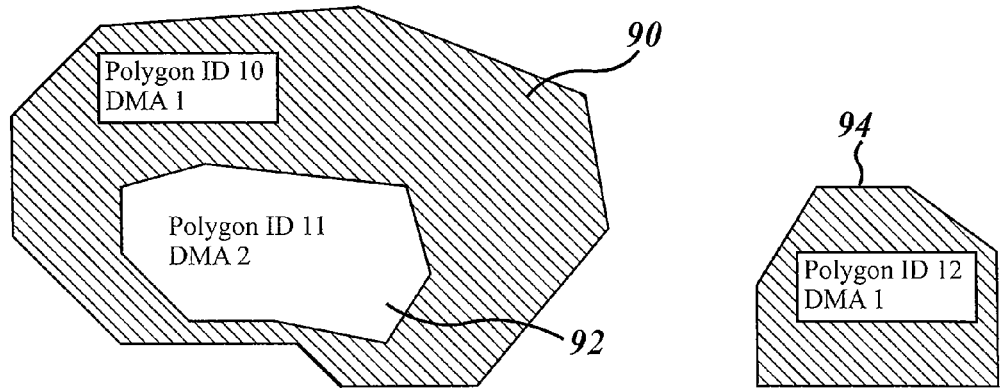
FIG. 4
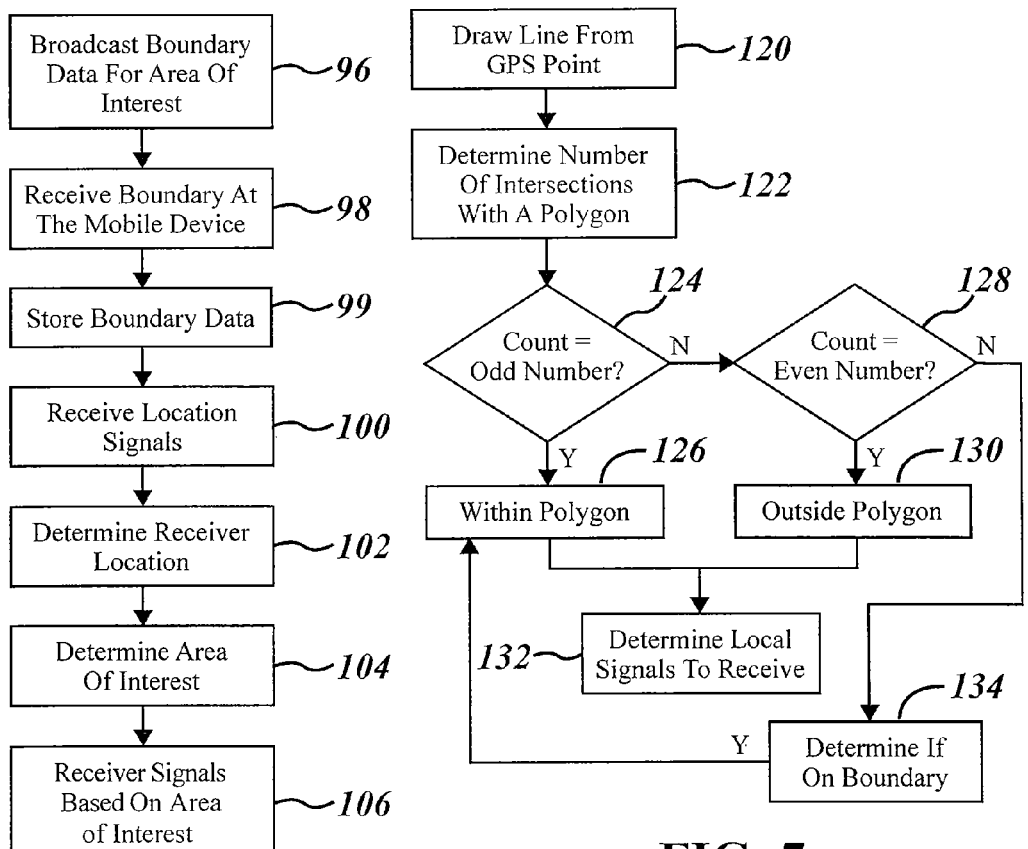
FIG. 5
FIG. 7

METHOD AND APPARATUS FOR PROVIDING PREAUTHORIZATION FOR A MOBILE RECEIVING DEVICE TO ACCESS WIRELESS NETWORKS

TECHNICAL FIELD

The present invention relates generally to a mobile receiving device, and more specifically, to a method and apparatus for obtaining preauthorization for a mobile receiving device to access a wireless network.

BACKGROUND

Satellite television has become increasingly popular due to its wide variety of programming. Entertainment in automobiles such as DVD players has also become increasingly popular. It would be desirable to provide a satellite television system for a vehicle so that the wide variety of programming may be enjoyed by the rear passengers.

Typical satellite systems include a receiving device that is used to receive satellite signals from the satellites and convert them to a usable format for playback on a television or monitor. Home-based systems use a telephone wire coupled to the satellite receiving device for conditional access, interactive services, pay-per-view and other return path applications. A conditional access signal grants the user rights to view the satellite signal content. Mobile receiving devices are not connected to a hard-wired line due to mobility.

As the popularity of the internet grows, wireless internet access such as local area networks, wireless access points, or hot-spots, is increasing.

It would therefore be desirable to provide a system that allows connectivity to a business controller through a wireless access point without the use of the satellite.

SUMMARY

In one aspect of the invention, a method includes generating a wireless network access signal, communicating the wireless network access signal to a mobile receiving device, storing the wireless access signal on a mobile receiving device, and enabling use of a wireless network by the mobile receiving device in response to the wireless access signal.

In a further aspect of the invention, a method includes determining a location of the mobile device, and obtaining a wireless network access signal for a wireless network in response to the location.

Other advantages and features of the present invention will become apparent when viewed in light of the detailed description of the preferred embodiment when taken in conjunction with the attached drawings and appended claims.

BRIEF DESCRIPTION OF THE DRAWINGS

FIG. 4 is an example of various combinations of regions that can be described using polygons according to the present invention.

FIG. 5 is a flow chart illustrating one method for operating the present invention.

FIG. 7 is a flow chart illustrating a point inclusion detection algorithm.

DETAILED DESCRIPTION

Figure 1:
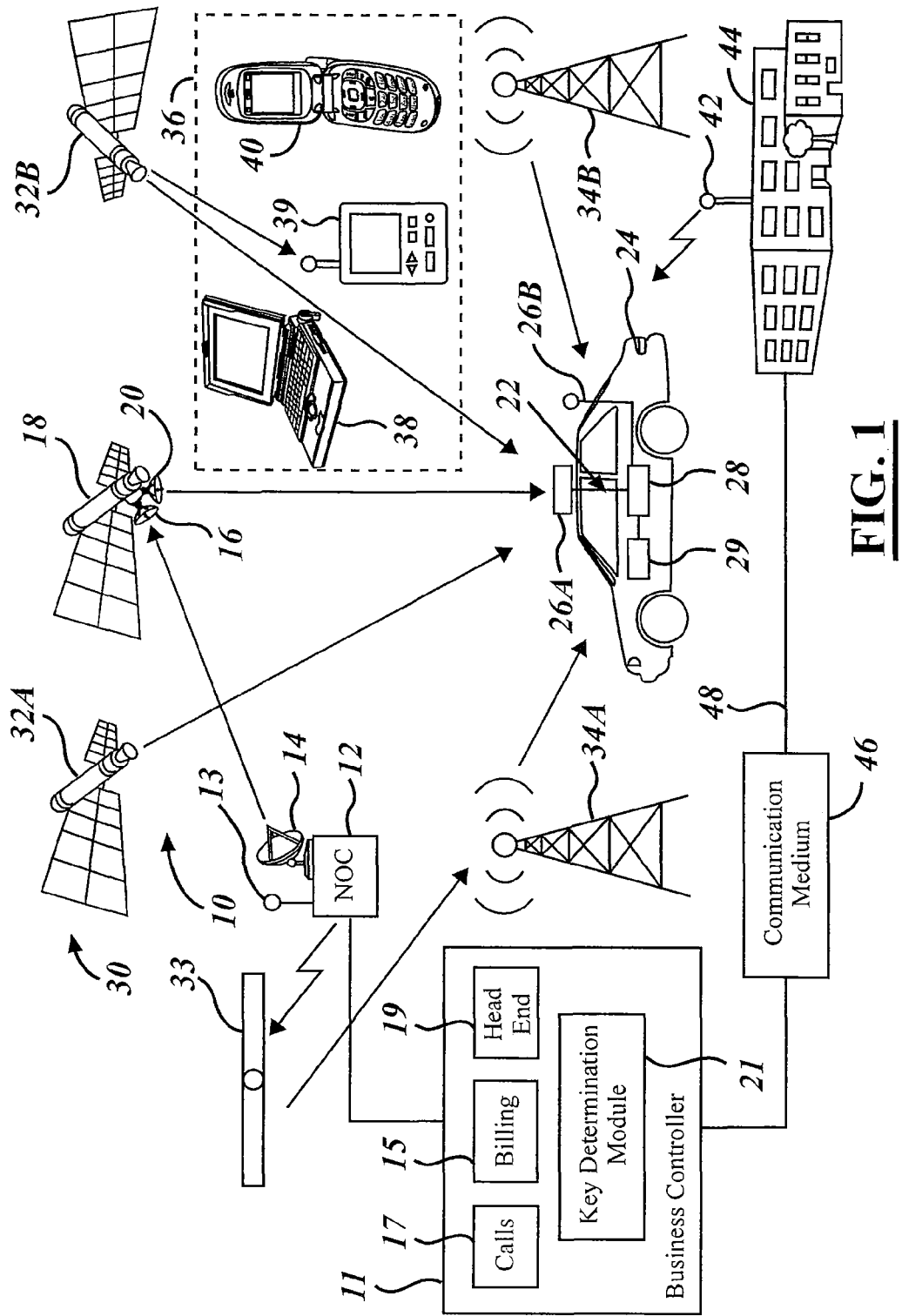
FIG. 1 is a system level view of a satellite broadcasting system according to the present invention.

In the following figures the same reference numerals will be used for the same views. The following figures are described with respect to a mobile satellite television system. However, those skilled in the art will recognize the teachings of the present invention may be applied to various types of mobile reception including land-based type systems.

Referring now to FIG. 1, a satellite television broadcasting system 10 is illustrated. The satellite television broadcasting system 10 includes a network operations center 12 coupled to a business controller 11 that generates wireless signals through a transmitting antenna 14 which are received by a receiving antenna 16 of a spaced-based system such as a satellite 18. The wireless signals, for example, may be digital.

A terrestrial antenna 13 for communicating terrestrially may be included on the NOC 12 as illustrated or the business controller 11. The terrestrial antenna 13 may generate signals as or part of to a cellular phone system, as a wireless local area network, RF, or the like.

As will be described below, the wireless signals may be entertainment content, boundary data for areas of interest such as designated marketing areas, wireless local area message information, wireless network access signals, and emergency message signals including an emergency announcement indicating emergency information and boundary areas associated therewith. Areas of interest may also include traffic, weather, hazardous material warning areas, advertising marketing area near a particular store or region or other types of areas.

A central location such as a business service controller 11 may be coupled the network operation center 12. The business service controller 11 is typically used in a DirecTV-type system for billing operations 15, Pay-Per-View and interactive programming. The business controller 11 may receive calls at a call center 17 and provide billing services through billing operations 15. The business controller 11 may also act as a head end 19 coupled to network operation center 12. The business controller 11 may also include a wireless network key determination module 21, the function of which will be described below. The business controller 11 or head end 19 may receive call-back signals for pay per view, for interactive services, for gaming and the like. The business controller 11 or head end 19 may also grant authorizations to content and provide the system with content and information signals.

The business controller 11 and the network operations center 12 may be physically separated or combined physically. Likewise, the functions illustrated may be physically separated, even geographically.

A transmitting antenna 20 generates signals directed to various receiving systems including stationary systems such as those in the home as well as mobile receiving systems 22. The wireless signals may have various types of information associated with them including location information. The wireless signals may also have various video and audio information associated therewith. As illustrated, the mobile receiving system 22 is disposed within an automotive vehicle 24. A receiving antenna 26A receives the wireless signals from the satellite 18 and processes the signals in a mobile receiving unit 28. A second antenna 26B may also be included for receiving other types of signals including various RF signals. The second antenna 26B may be used to receive emergency message signals as will be described below. The mobile receiving unit 28 and its operation will be further described below.

The mobile receiving unit 28 may also interface with the vehicle audio system 29 to provide various information to the occupants. For example, audible emergency messages may be broadcast over the vehicle speakers as well as in the mobile receiving unit. The driver, not the passengers, may be the relevant recipient of the emergency message signals.

The system 10 may also receive location signals from a GPS system 30 that includes a first satellite 32A and a second satellite 32B. Although only two satellites are shown, a typical GPS system includes several satellites, several of which may be in view at any particular time. Triangulation techniques may be used to determine the elevation, latitude and longitude of the system. A locating system may also include towers 34A and 34B that may be used by the mobile receiving system 22 to determine a location. The towers and the antennas associated therewith may be cellular phone, radio or TV tower. Cellular phones typically may also include a GPS locating system. As the vehicle 24 moves about, the exact coordinates in latitude and longitude may be used to determine the proper area of interest such as a designated marketing area which will control the mobile devices choices for local television and such broadcasted data. The towers 34A, 34B may also act as an RF source for transmitting emergency message signals and announcement indicators.

The system may also receive boundary information such as boundary points of designated marketing area or wireless network polygons from the terrestrial-based system such as the towers 34A and 34B. In addition, the satellites 18 may also be replaced with stratospheric platforms 33 for transmitting the designated marketing areas and emergency message signals and indicators to the mobile device. Stratospheric platforms 33 may be manned or unmanned airplanes, airships, or the like that fly above commercial airspace. It is envisioned that stratospheric platforms may fly at altitudes between 60,000 and 100,000 feet from the surface of the earth. Thus, the stratospheric platforms are in a significantly lower position than even low earth orbit satellites.

The present invention may also be used for displaying various wireless information on a personal mobile device 36 such as a laptop computer 38, a personal digital assistant 39, and a cellular telephone 40. It should be noted that these devices and the automotive-based devices may also receive wireless signals having various types of information associated therewith from the cellular towers 34A and 34B. Other types of information may be broadcast from other types of broadcasting areas such as an antenna 42 on a building 44. The antenna 42 may be an antenna for a wireless local area network for access to a communication medium 46 such as on the internet, public service telephone network, or the like. The communication medium 46 is coupled to the business controller 11. As will be described below, various return path or return link services may be enabled such as pay-per-view, gaming, on-demand services and interactive services. Also, packets of missing data from the satellite transmission may also be obtained through the return path 48. The return link may thus include the wireless network above or in combination with a wired network such as the Internet, PSTN, cable or broadband wires. The antenna 42 may be used, for example, for wireless internet access over a wireless local area network. The building 44 may be various types of buildings such as a store and the wireless information transmitted from the antenna 42 may be advertising information or emergency information.

Figure 2:
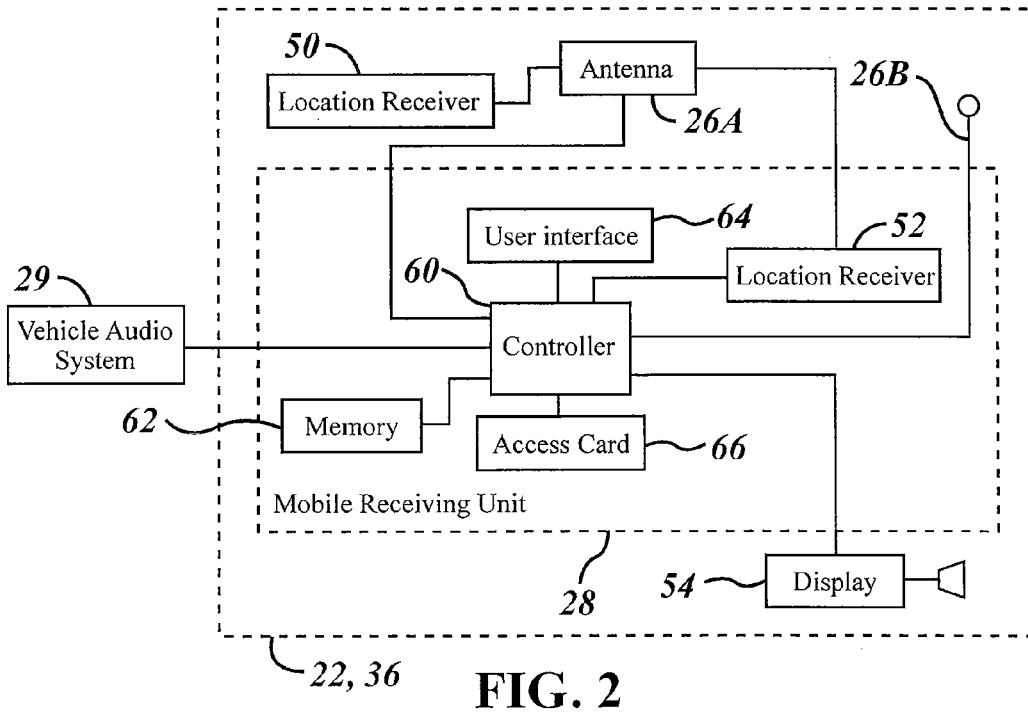
FIG. 2 is a block diagrammatic view of a vehicle having a receiving system according to the present invention.

Referring now to FIG. 2, a receiving unit 22 is illustrated in further detail. Antenna 26A may be various types of antennas including a rotating antenna which is used to track the relative movement of the satellite or other transponding device with respect to the vehicle. The antenna 26 may be a single antenna used for satellite television reception, or a number of antennas such as one for receiving television signals and one coupled to a location receiver 50 such as GPS receiver. The antenna 26 may also be an electronic antenna.

A second antenna 26B may also include a terrestrial antenna used for receiving terrestrial signals such as receiving cellular or wireless network signals.

The mobile receiving unit 28 may also include a location receiver 52 integrated therein. The location receiver 52 may be a GPS receiver. In a preferred embodiment, only one location receiver 50, 52 may be provided in the system. However, the location receiver 50, 52 may be part of the vehicle 24 or may be part of the mobile receiving system 22, 36. The controller 60 may be coupled directly to GPS receiver 52 and/or GPS receiver 50.

The mobile receiving unit 28 includes a display 54. The display 54 may be incorporated into the device 36 or within the vehicle 24.

A controller 60 that is microprocessor-based may be used to control the various functions of the receiving unit 28. The controller 60 may also be coupled to the vehicle audio system 29 so that emergency information may be displayed audibly or visually thereby. Such functions include acting as a tuner, receiver, decoder, buffer and other functions. The controller 60 may be similar to that found in current DirecTV set top boxes or integrated receiver decoders which employ a chip-based multifunctional controller. The controller 60 may include or be coupled to a memory 62. Memory 62 may be used to store the boundaries of various areas of interest received from the antenna as broadcast by one of the devices 32, 33 or 34 described above. An area of interest is a fixed geographic or cartographic area bounded by a closed shape such as a polygon, circle, curved or straight line segments, or the like. The fixed area or closed shape has outer boundaries that do not move on the surface of the earth. As will be shown below, areas may be excluded (island-like) within a closed shape. Although the areas are fixed, they may be, from time to time, redetermined and rebroadcast to the mobile device for usage. One feature is that as the vehicle or mobile device moves, the area of interest remains fixed on the surface of the earth and thus the device may enter into another area of interest. Boundaries of certain areas of interest such as a designated marketing area (DMA) may be defined by Nielsen and may be pre-programmed into the memory 62 as a number of polygons wherein each point of each side is defined in cartographic coordinates of longitude and latitude and fractions of degrees. Areas of interest may also include bounding for wireless networks, or the like. The boundaries of the wireless network may be determined during construction of the network so that the boundaries are fixed and predictable. As will be described below the polygons may be formed of corners whose latitude and longitude are stored within the memory.

The location receiver 52 is capable of providing latitude and longitude to the controller 60. The controller 60 may be used to compare the location signals from the location receiver 50, 52 to the boundaries of the areas of interest such that the mobile device can determine which areas of interest it is within and which areas of interest it is not within. From this determination it can control the mobile receiving device or IRD behavior such as allowing or disallowing display of certain audio or video channels or connecting to various wireless networks to provide a return path to the business center. One application is to broadcast areas of interest that represent designated marketing areas to determine which designated marketing area wireless network or the mobile device is within and which area it is not within, which signals the system should be receiving. These signals may coincide with or coordinate to the local broadcasting signals for the specific designated marketing area. It should be noted that more than one designated marketing area or wireless network may be provided for a particular area. That is, adjacent areas may also be authorized for viewing or receiving. Various fringe regions may be used around a particular designated marketing area to provide hysteresis for the system. This function will be further described below.

The controller 60 may also be coupled to a user interface 64. User interface 64 may be various types of user interfaces such as a keyboard, push buttons, a touch screen, a voice activated interface, or the like. User interface 64 may be used to select a channel, select various information, change the volume, change the display appearance, or other functions. The user interface 64 is illustrated as part of the mobile receiving unit. However, should the unit be incorporated into a vehicle, the user interface 64 may be located external to the mobile receiving unit such as dial buttons, voice activated system, or the like incorporated into the vehicle and interface with the mobile receiving unit.

An access card 66 may also be incorporated into the mobile receiving unit. Access cards such as conditional access module (CAM) cards are typically found in DirecTV units. The access card 66 may provide conditional access to various channels and wireless signals generated by the system. Not having an access card or not having an up-to-date access card 66 may prevent the user from receiving or displaying various wireless content from the system.

Figure 3:
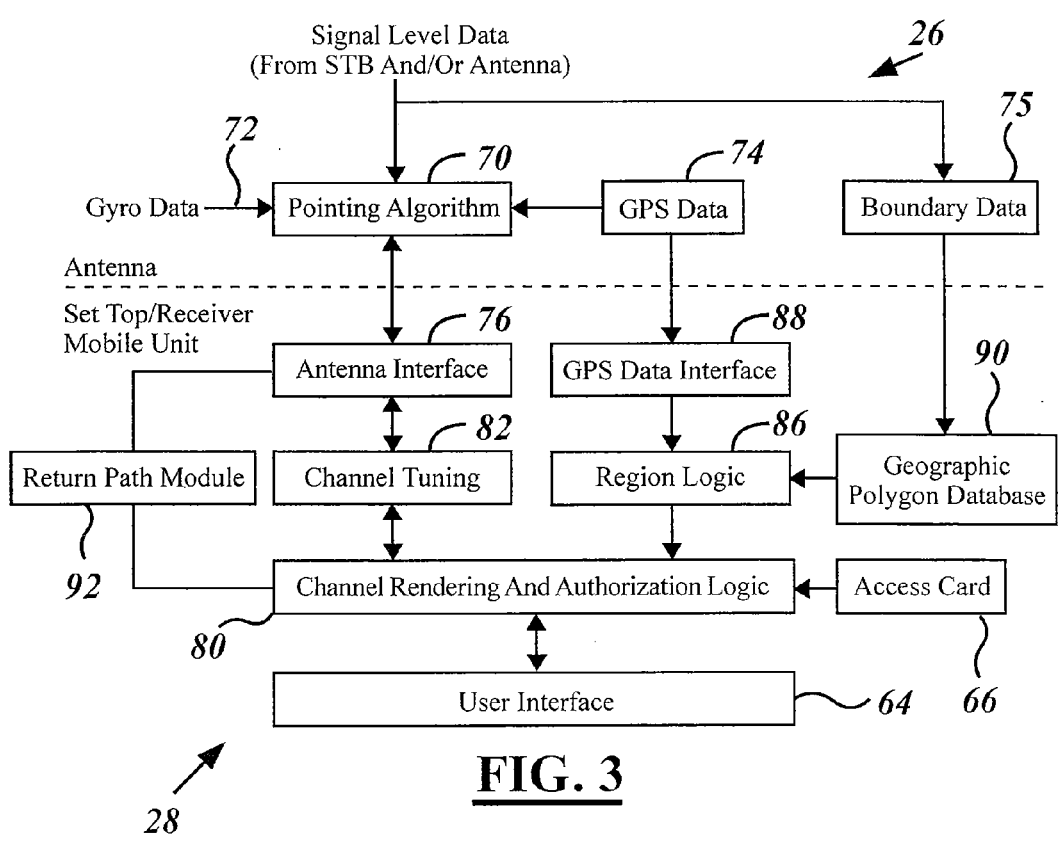
FIG. 3 is a block diagrammatic view of the various logic of the antenna and the set top mobile receiving unit.

Referring now to FIG. 3, a block diagrammatic view of the mobile receiving unit 28 and the antenna 26 is illustrated. The boxes here represent the software logic that may be used to implement the invention. Various information may be associated with the antenna 26. The antenna 26 may include a pointing algorithm 70 therein. The pointing algorithm 70 may receive information from gyros in the antenna and be provided as gyro data 72. GPS data 74 may be provided from the GPS or location receiver 50, 52 illustrated above in FIG. 2. Other information may be provided from the mobile receiving unit such as channel tuning information and the like.

The antenna may also be used to receive boundary data 75 from the various sources described above. The boundary data 75 may be received from a satellite, a terrestrial-based systems, or a stratospheric platform. The boundary data 75 is stored within the memory 90. The boundary data may include many forms including equations for line segments, corners of intersections of line segments in latitude and longitude, or other information defining the boundaries of the wireless network or designated marketing areas.

The mobile receiving unit 28 may include an antenna interface 76 that is used to communicate with the antennas 26A and 26B above. The antenna interface 76 formats the signals from the mobile receiving unit. For example, various signal level data such as the channel tuning information may be provided. Data from the user interface 64 and the conditional access card 66 may be used by the channel rendering and authentication logic 80. The channel rendering and authentication logic 80 may authorize the particular user based upon the conditional access card. Information entered from the user interface such as a password may also be used in the authentication logic. Various methods for authentication are well known in the art. The channel rendering portion of the channel rendering and authentication logic 80 receives information from the user interface 64 as to which wireless signals the user would like to receive. In the case of emergency signals, the signals may communicate tuning information that will signal the rendering logic 80 to automatically override the user's choice and tune to the emergency information. This will be described below. The channel rendering and authentication logic 80 generates signals that are provided to the channel tuning logic 82. The channel tuning logic 82 provides channel tuning information based upon the channel rendering information. The channel tuning logic 82 may include a receiver and a decoder used for receiving and decoding the appropriate channels including emergency channels. The channel tuning logic 82 may provide information to the antenna interface 76 such as the direction of the signal or satellite that contains the particular channel that is desired. This information may be used by the pointing algorithm 70 to rotate the antenna in the appropriate direction.

The controller may also include receiving logic 86. The receiving logic 86 may provide information to the channel rendering logic 80 as to the particular region or wireless network that the antenna or the mobile receiving unit is located. The region logic 86 may be coupled to the GPS data interface 88. The GPS data interface 88 provides GPS information to the region logic so that appropriate signals may be received or displayed.

One use of the receiving logic 86 is that based upon the GPS signals, the location of the receiving unit may be detected. The receiving logic 86 may then look up in a geographic polygon database or location database 90 which designated marketing area or wireless network the receiving device is located within. From this information the appropriate geographically specific data such as local broadcast television channels, emergency information or wireless network to form a return path may be selected. The database 90 may consist of polygon boundary information used to define the marketing areas. The database 90 may also include other information such as zip code information or other ranges of data used for comparison with the signals. As will be evident to those skilled in the art, the wireless signals may be received with various location data used to identify the location appropriate for the signal to be displayed in. For example, the data may include information such as that the particular signal may be a local broadcast from the Washington, D.C. area, whereas other signals may indicate local broadcasting from the Baltimore area. When the vehicle is in the proper location, the proper signal may be displayed on the mobile device.

The location information may be provided in various portions of the signal. If the signal is an all digital signal the location information may be provided in a preamble of the information packet. If the signal is an analog signal the location data may be included in a vertical blanking interval of an analog television signal or as unused bandwidth of a digital television signal. In a purely analog signal, the location data may be superimposed digitally on the analog signal.

A return path module 92 may be included. The return path module 92 may determine the proper wireless network to communicate with and request the appropriate access signals or keys as will be described below. That is, preauthorizations for adjacent or proximate networks may be obtained as the wireless mobile device moves.

Referring now to FIG. 4, an example of a complex area of interest on the surface of the earth is shown. Although a designated marketing area is used in this example, the same applies to emergency area boundaries and wireless network boundaries. A polygon having ID 10 and an assigned market area value of 1 is shown as area 90. Area 92 corresponds to a polygon ID of 11 and an assigned market ID value of 2. Polygon 94 is also of market area 1 and has a polygon ID of 12. It should be noted that each of the polygons are closed polygons. It should also be noted that there is no overlap between Area 92 and Area 90 such that Area 92 is an island inside Area 90. Area 90 taken by itself contains a hole the shape of Area 92. One method for determining boundaries of a polygon as a set of longitude and latitude points is set forth as:

```
typedef struct {
    polygon id
    number of polygon points
    for (i = 0; i < number of market areas in object; i++) {
        latitude degrees value
        latitude 1/1000 minutes value
        longitude degrees value
        longitude 1/1000 minutes value
} POLYGON_T;
```

The unique polygon ID may be used in a data structure such that the designated marketing area can be a set of unjoined polygons as well as excluded regions as set forth in:

```
typedef struct {
    DMA id
    length of DMA
    number of included regions
    for (i = 0; 1 < number of included regions; i++) {
        polygon Id
    }
    number of excluded regions
    for i = 0; i< number of excluded regions; i ++) {
        polygon id
} DMA T:
```

A representation of the designated marketing area 1 may be illustrated in code as:

| DMA id | 1 |
| number of included regions | 2 |
| polygon id | 10 |
| polygon id | 12 |
| number of excluded regions | 1 |
| polygon id | 11 |

Referring now to FIG. 5, a method for operating a television broadcasting system is illustrated. Similar logic applies to emergency areas and wireless networks. In step 96 the boundary data for the area of interest is broadcast by one of the types of devices described above such as a satellite, a terrestrial-based antenna, a cellular tower, or stratospheric platform. In step 98 the boundary information is received at the mobile device. In step 99 the boundary data is stored in the memory of the mobile device.

In step 100, the system or mobile device receives location signals. The receiver location is determined from the location signals in step 102. As mentioned above, the location signals may use GPS satellites or cellular telephone systems for determining the exact longitude and latitude down to an acceptable limit to determine the location of the mobile receiving device.

In step 104, the area of interest for the receiver location is determined. As mentioned above, various polygons or the like may be stored in the memory of the receiving device so that the particular area of interest at that moment in time for the position of the mobile receiving device may be determined. In the wireless network example, the particular network may be determined. A lookup table for coordinates may be set forth or polygonal areas may be set forth to determine in which designated marketing area the mobile receiving device is located. If the system is not used for television signals, this step may be optional. Determining inclusion within an area of interest is set forth in FIG. 7.

In step 106, the controller of the system selects the particular local channel or wireless network based upon the determination of the designated marketing area in step 84. Of course, some hysteresis may be accounted for in this method.

Referring now to FIGS. 6A-6D, various irregular shaped closed polygons are illustrated. The mobile device is located at the respective point 110A-110D in each of the various figures, respectively. The polygonal shapes 112A-112E are shown as irregular shapes. When the system is operated, it is not known whether the mobile device is located within or outside of the boundaries. One method for determining this is using a point inclusion detection algorithm. A line is arbitrarily drawn in a direction from the mobile device or point 110 in each of the figures. This is performed using a raycasting technique. In the raycasting the number of intersections with a line is determined. Although in FIG. 6 horizontal lines are shown, various other directions may be drawn.

Figure 6A:
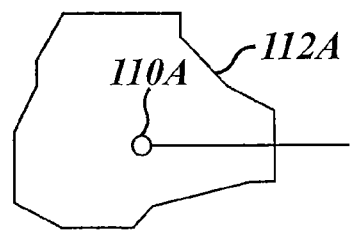
FIGS. 6A-6E are a top view of various polygons for use in a point inclusion detection algorithm.

In FIG. 6A, the number of intersections between the point 110A and the polygon is one. Therefore, any odd numbered amounts correspond to the mobile device being within the polygon.

Figure 6B:
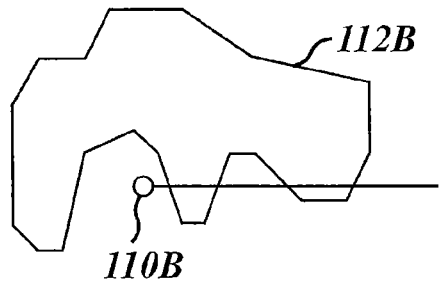

Referring now to FIG. 6B, four intersections of the line from point 90B is illustrated. Thus, a count of the number of intersections is four and thus the point is outside the polygon.

Figure 6C:
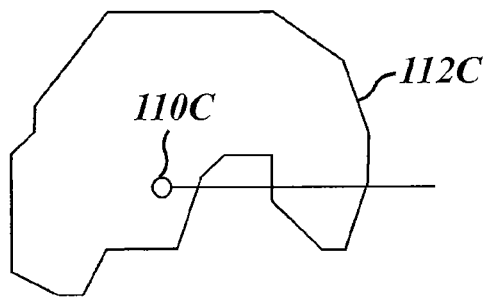

In FIG. 6C, three intersection points are counted. Therefore, the point 90C is within the designated marketing area.

Figure 6D:
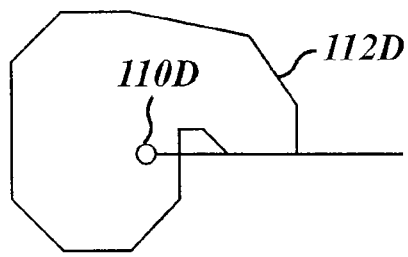

In FIG. 6D, the points of the polygon are on the GPS points line. In this case, all the polygon points should be ignored as intersections and only when the polygon's points have crossed the GPS line should an intersection be counted. In this case, there is just one intersection and the GPS point is therefore inside the polygon because of the odd number.

In summary, an odd number of intersections indicates that a point is within a polygon. An even number of intersections indicates the GPS point is outside the polygon.

Figure 6E:
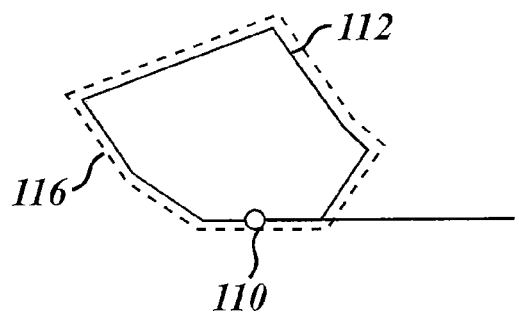

Referring now to FIG. 6E, the GPS point 110E is on the boundary of the polygon. In this case the GPS point will be defined as being inside the polygon. Because the boundary of one polygon is likely to be the boundary of an adjacent polygon, the GPS point 110E may be a member of multiple regions when it lies on the boundary lines between the areas of interest. This may be confusing for a system. Therefore, if the mobile device is within the polygon and is moving toward the boundary, hysteresis buffer zone 116 may be provided around the polygon so that not until the vehicle or mobile device leaves the buffer zone 116 would the behavior of the mobile device change.

Referring now to FIG. 7, a method for performing a point inclusion detection algorithm is illustrated. In step 120, a line is drawn from a GPS point. In step 122, the number of intersections of the line with the closed polygon is determined. In step 124, if an odd number is counted in step 124, step 126 determines that the system is within the polygon and within the designated marketing area.

Referring back to step 124, if the count is not odd step 128 is executed. In step 124, if the count is even, the system is outside the polygon in step 130. If the count is not even or odd in step 128, step 132 is executed in which it is determined whether or not the system is on a boundary. A boundary system is illustrated in FIG. 5E above. If the system is on a boundary, the system determines whether it is within a polygon in step 134. After both steps 126 and 130 are executed, the controller of the system determines the local signal to receive based upon the designated marketing area. These channels are displayed on the display of the receiving device.

Figure 8:
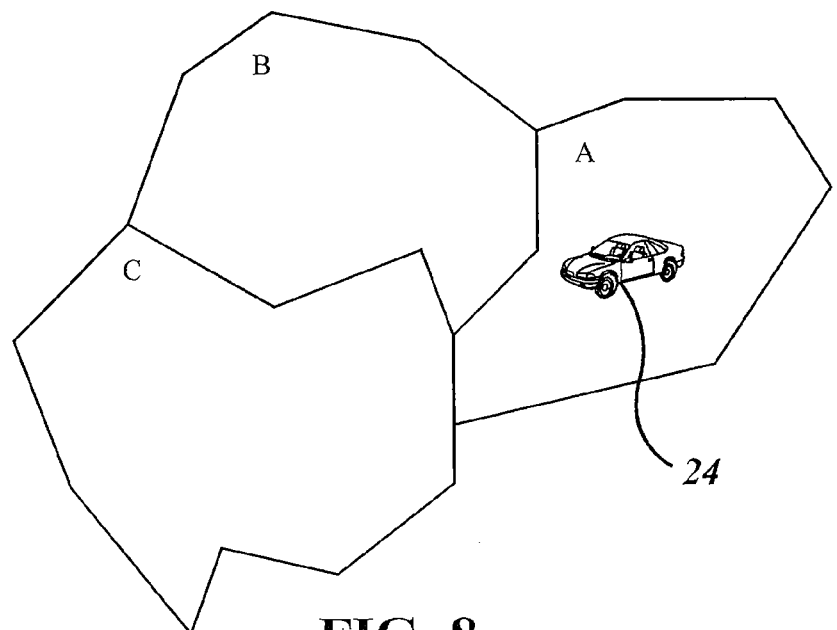
FIG. 8 is a top view of three adjacent polygonal direct marketing areas.

Referring now to FIG. 8, a plurality of areas of interest such as designated marketing area polygons, emergency information polygons or wireless network boundaries are illustrated as A, B, and C. At some segment each of the polygons are adjacent to each other. The points representing each polygon may follow any arbitrary rule such as political boundaries, geographic boundaries, or any areas of interest. Various types of information may be transmitted to the mobile device such as vehicle 24 to convey the boundaries. In one implementation, the mobile device may receive corner points in latitude and longitude. Based upon the boundaries of the polygon, the device may determine in which polygons it is inside and which it is outside. Various actions may be performed by the mobile device as a result of determining which polygon it is in based upon coded actions or instructions that use the broadcasted polygon. It should be noted that emergency information polygons may not be the same or coincide with designated marketing areas either of which may not coincide with a wireless network.

Figure 9:
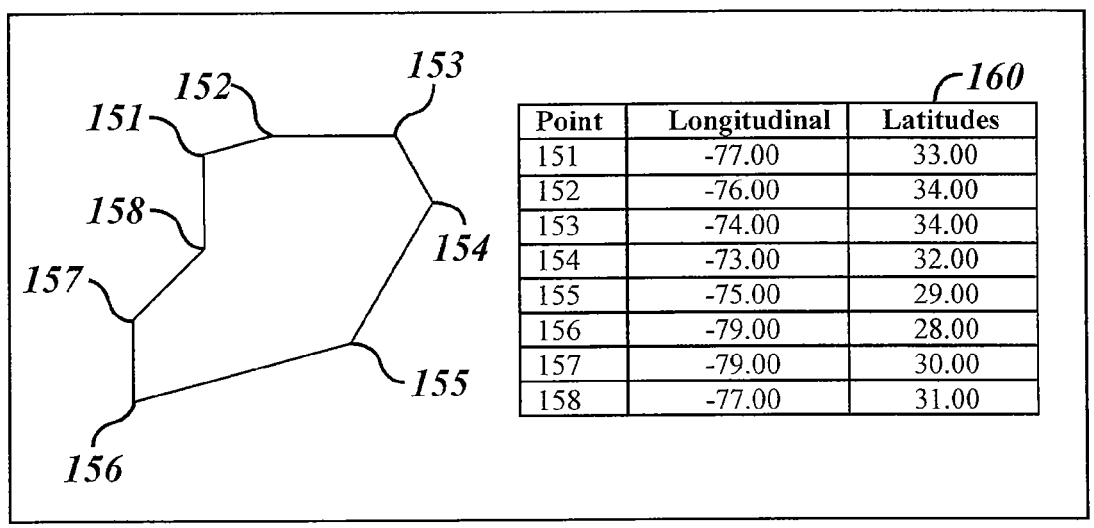
FIG. 9 is a top view of polygonal region A of FIG. 8 with a table identifying the corner points.

Referring now to FIG. 9, polygon A of FIG. 8 is illustrated in further detail. Each of the corner points represents an intersection of two line segments of the polygon. In this example, points 151 through 158 represent corners of the polygon. Table 160 includes the point, the longitude and the latitude of each of the corner points. Thus, the points representing the polygon may be transmitted in a data structure that will be received by the receiving device as an object used for comparison with the GPS location. One example of a C-style structure of an object is set forth below.

```
struct geographic_polygon {
    int             unique_id;
    int             version;
    int             number_of_points;
    for (i = 0; i < number_of_points; i++) {
        int         longitude_degrees;
        int         longitude_minutes;
        int         longitude_seconds;
        int         latitude_degrees;
        int         latitude_minutes;
        int         latitude_seconds;
    }
}
```

Thus, each geographic polygon may be transmitted as a unique object that may be referenced individually. In this manner, a series of geographic polygons can be transmitted to a mobile device and stored in a memory such as dynamic random access memory or a non-volatile memory such as flash memory. This memory may then be periodically referenced as the mobile device's GPS coordinates change. By comparing the GPS coordinates with the polygonal boundaries, the receiving device may determine which polygon it is in and which polygon it is outside of. Various actions may be taken in response to the particular polygon, such as the types of displays or assorted messages may be displayed to the user, various audio clips may be played, allowing or blocking various channels to be displayed on the display device, or tuning to a particular broadcast channel may be performed in response to the comparison to the polygonal boundaries and the GPS coordinates.

Examples of a use of broadcasted polygons are for providing designated marketing areas for local channel display or blockage, for emergency message signals or for wireless network determination. The satellite or other device may broadcast a geographic polygon for each area of interest because the area of interest has a unique ID and version. Updates to a particular polygon representing an area of interest may be dynamically performed in the future. The mobile receiver then evaluates its location in reference to which polygon it is in and as a result, various expressions may be activated or deactivated. This may take the form of activating or deactivating various local channels.

Another example of the use of the present invention is in emergency weather situations where all mobile receiving devices in a geographic area may be notified of an impending severe weather situation. This may also be used for non-weather situations such as in conveying disaster information. In this manner, a complex polygon may be broadcast and vehicles within the polygon may receive the message detailing the specific weather or other type of alert.

Figure 10:
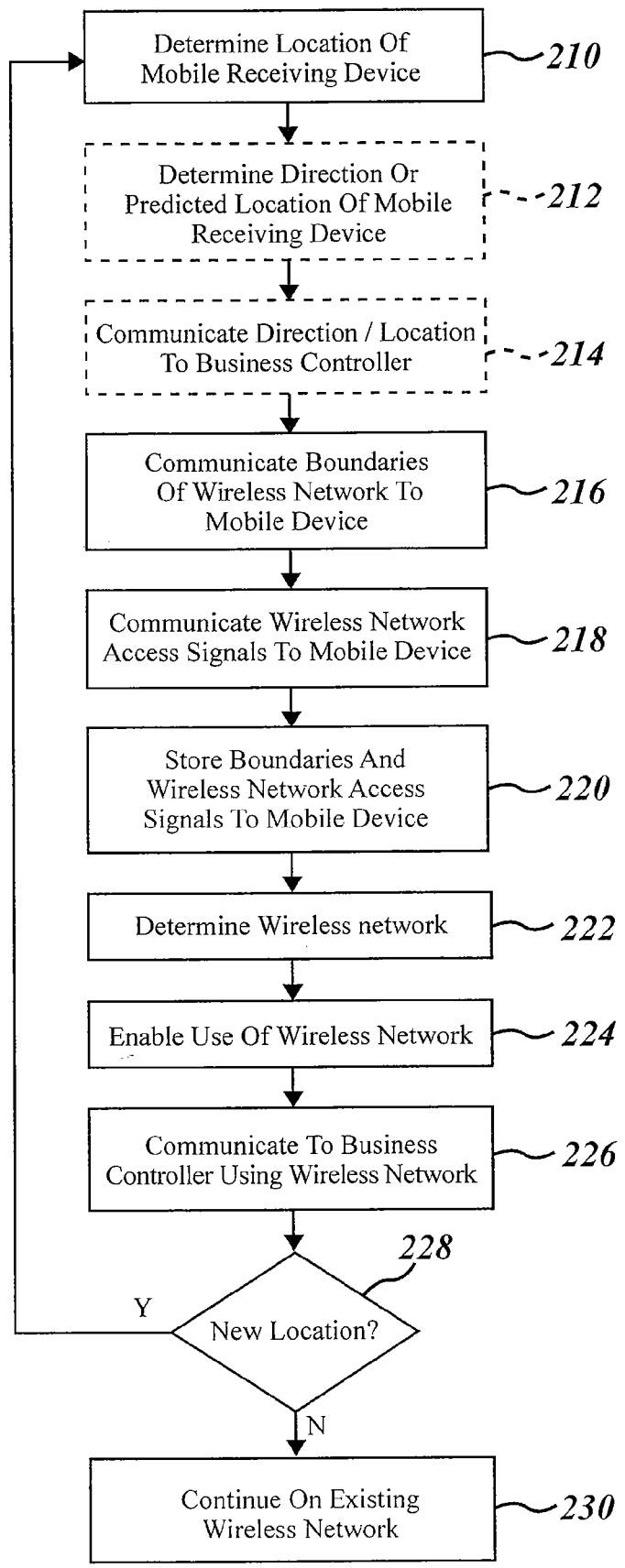
FIG. 10 is a flowchart illustrating a method of communicating over a return path using a wireless network.

Referring now to FIG. 10, a method of operating a communication system is set forth. In step 210, the location of a mobile receiving device is determined. In step 212, the direction or predicted location of the mobile receiving device is determined. This step is an optional step. The direction of the mobile receiving device may be determined by using consecutive GPS measurements so that a general direction of the mobile receiving device may be determined. In step 214, another optional step is set forth in which the direction or location of the mobile receiving device is communicated to the business controller. As will be mentioned below, the location may be communicated using a wireless network such as a cellular network or a wireless internet network, or the like.

In step 216, boundaries of the wireless network are communicated to the mobile device. The boundaries of the network may be communicated over the satellite system or a wireless network. In step 218, wireless access signals are communicated to the mobile device. The wireless access signals may be based upon or provide a key, such as a WEP key, to various wireless networks such as wireless internet networks. These may be based on the predicted direction and location of the mobile receiving device. Both the boundaries and the wireless network access signals may be communicated simultaneously or separately. By determining the future or possible future directions of the mobile device, preauthorization may be obtained from the business controller. The business controller may obtain these keys or access signals in advance or in real time while the mobile device is moving about.

In step 220, the boundaries of the wireless network access signals are stored on the mobile device. In step 222, one of the wireless networks is determined using the various boundaries. In step 224, the associated wireless network access signal or key is used to enable the use of the wireless network. In step 226, communication is performed between the business controller and the mobile device using the wireless network to which the wireless network access signal has enabled. Communication takes place over the return path 48 described above in FIG. 1. As mentioned above, the return path may include wireless internet access through a wireless local area network, or the like.

Referring now to step 228, as the mobile receiving device moves, if a new location is present, the location of the receiving device is again determined. Steps 210 through steps 226 are again performed. In step 228, if no new location is determined, communication on the existing wireless network is maintained. This may also take place when the vehicle or mobile receiving device is powered down or stopped. Upon the re-powering of the device, the previously used wireless network may be attempted first.

Examples of uses for the return link through the wireless network include call-back signals, requests for missing packets that were not properly received, requests for on-demand videos, pay-per-views, games and interactive services. The return link through the wireless network enhances the available features and increases business opportunities of the system. After receiving the wireless access signals, content such as on-demand and interactive content, may be obtained via the wireless network.

While the above example has been set forth with respect to a single signal, it should be noted that multiple satellite signals may be used in a similar manner. That is, because there are many users within a vehicle, each user may have the capability of selecting various channels.

What is claimed is:

1. A method comprising:
providing a wireless network that requires a wireless network access signal to obtain access thereto;
generating a wireless network access signal at a business center;
communicating the wireless network access signal to a mobile receiving device from the business center;
storing the wireless network access signal within the mobile receiving device;
communicating the wireless access signal from the mobile receiving device to the wireless network; and
enabling use of the wireless network when the wireless network access signal is an appropriate wireless network access signal.

2. A method as recited in claim 1 wherein communicating comprises communicating the wireless network access signal through a satellite.

3. A method as recited in claim 1 wherein communicating comprises wirelessly communicating the wireless network access signal.

4. A method as recited in claim 3 wherein wirelessly communicating the wireless network access signal comprises communicating the wireless network access signal through a wireless network.

5. A method as recited in claim 3 wherein wirelessly communicating the wireless network access signal comprises communicating the wireless network access signal through a WiFi network.

6. A method as recited in claim 3 wherein wirelessly communicating the wireless network access signal comprises communicating the wireless network access signal through a cellular phone network.

7. A method as recited in claim 3 wherein wirelessly communicating the wireless network access signal comprises communicating the wireless network access signal through a wireless local area network.

8. A method as recited in claim 3 wherein wirelessly communicating the wireless network access signal comprises communicating the wireless network access signal through a stratospheric platform.

9. A method as recited in claim 1 wherein the mobile receiving device comprises a mobile satellite receiver receiving satellite signals and communicating on a return link through the wireless network.

10. A method as recited in claim 1 wherein enabling use of a wireless network by the mobile receiving device in response to the wireless network access signal comprises enabling use of a wireless network by the mobile receiving device for transmitting signals to the business center.

11. A method as recited in claim 1 wherein enabling use of a wireless network by the mobile receiving device in response to the wireless network access signal comprises enabling use of a wireless network by the mobile receiving device for transmitting signal to and receiving signals from the business center.

12. A method of operating a mobile device comprising:
electronically determining a location of the mobile device and a wireless network for the location; and
at the mobile device, electronically obtaining a wireless network access signal for the wireless network in response to the location, said wireless network access signal enables communication through the wireless network.

13. A method as recited in claim 12 further comprising storing the wireless network access signal within the mobile receiving device.

14. A method as recited in claim 12 further comprising communicating to a business controller through the wireless network using the wireless network access signals.

15. A method as recited in claim 14 wherein communicating comprises communicating an authorization request.

16. A method as recited in claim 14 wherein communicating comprises communicating a query signal for missing packets of a satellite signal.

17. A method as recited in claim 12 further comprising determining a predicted location based on movement of the mobile device and wherein obtaining the wireless network access signal comprises obtaining the wireless network access signal in response to the predicted location.

18. A method as recited in claim 12 wherein determining a location comprises determining a location in response to a global positioning system.

19. A method as recited in claim 12 wherein determining a location comprises determining the location in response to a cellular phone system.

20. A method as recited in claim 12 wherein the mobile device comprises a mobile phone.

21. A method as recited in claim 12 wherein the mobile device comprises a personal electronic device.

22. A method as recited in claim 12 wherein obtaining a wireless network access signal comprises obtaining the wireless network access signal from a business controller.

23. A method as recited in claim 12 wherein obtaining a wireless network access signal comprises obtaining the wireless network access signal from a business controller through a satellite.

24. A method as recited in claim 12 wherein obtaining a wireless network access signal comprises requesting the wireless network access signal from a business controller through a cellular network.

* * * * *